United States Patent [19]

Creinin et al.

[11] 4,108,847

[45] Aug. 22, 1978

[54] METHOD FOR PREPARING BLAND PROTEIN ENRICHED PRODUCTS FROM GRAIN GLUTEN

[75] Inventors: Howard Lee Creinin, Worthington, Ohio; Michael Shemer, Haifa, Israel

[73] Assignee: Miles Laboratories, Inc., Elkhart, Ind.

[21] Appl. No.: 831,777

[22] Filed: Sep. 9, 1977

[51] Int. Cl.$^2$ .............................................. A23J 1/12
[52] U.S. Cl. ................................ 260/112 G; 260/123; 426/104
[58] Field of Search ........................... 260/112 G, 123

[56] References Cited

U.S. PATENT DOCUMENTS

| 313,665 | 3/1885 | Greene | 260/123 |
|---|---|---|---|
| 2,310,184 | 2/1943 | Schopmeyer et al. | 260/412.2 |
| 2,861,061 | 11/1958 | Borel et al. | 260/123 |
| 2,861,062 | 11/1958 | Borel et al. | 260/112 G X |
| 3,351,531 | 11/1967 | Noznick et al. | 260/112 G UX |
| 3,852,504 | 12/1974 | Mihara et al. | 260/112 G X |

*Primary Examiner*—Howard E. Schain
*Attorney, Agent, or Firm*—Richard W. Winchell

[57] ABSTRACT

A bland, protein enriched product is produced by forming an aqueous slurry of a crude grain gluten which contains oil and water soluble constituents at a pH between about 6.5 and 10.0, agitating the slurry to form an oil-water emulsion, separating the gluten solids from the emulsion which contains oil and water-soluble constituents; and drying the separated gluten product.

5 Claims, No Drawings

METHOD FOR PREPARING BLAND PROTEIN ENRICHED PRODUCTS FROM GRAIN GLUTEN

BACKGROUND AND PRIOR ART

For years food scientists have had a continuing interest in producing palatable, nutritious proteinaceous food products from plant sources as a supplement to or as a replacement for animal protein foods. The proteinaceous products must be economical, nutritionally well balanced and aesthetically acceptable to the human consumer, i.e., the product must be bland in flavor and odor and must be free of objectionable colors. At the present time, such proteinaceous food products are principally prepared from soybeans. Unfortunately, the soy proteins are relatively deficient in some essential sulfur bearing amino acids.

It is well known that many of the inherent disadvantages of soybeans can be overcome by combining the soy protein with proteins from another source. For example, the protein from cereal grain has an amino acid composition which compliments the amino acid composition of soy protein, i.e., the amino acids which are low in soy protein are high in the cereal grains. Thus, because of their low cost and nutritional value, the crude grain glutens from such cereals as corn, sorghum, wheat and the like have been frequently suggested as having potential use, in combination with soy protein, in food products. In particular, it has been suggested to use corn gluten. Major obstacles, however, to the general use of crude grain gluten have been the characteristic bad flavors and odors, intense colors, oils, and high moisture contents of these potential sources.

Considerable efforts have been made in the past to prepare protein products from grain gluten using classical methods, but such efforts have been only moderately successful. These efforts have not allowed the valuable protein to be recovered in commercial quantities at low cost or completely free of the gluten's characteristic flavors, odors, colors, carbohydrates or salts.

Generally, the classical methods of extraction using linear hydrocarbon solvents have not been satisfactory due to the immiscibility of the solvents with the high amounts of water usually present in the grain gluten. Hydrophilic solvents, such as the lower aliphatic alcohols, have also been used for deoiling oilseeds, but they cannot be used successfully with aqueous wet gluten without serious loss of the alcohol soluble protein fraction. The combination of aqueous alkaline extraction and solvent extraction of cereal grain materials such as corn germ, described by Nielsen et al. in Food Engineering, April 1973, p. 76–77, or such as ground corn having normal and high contents of lysine, described by Wu et al., J. Food Sci. 41:509–512 (1976), has been moderately successful to produce corn concentrates or isolates. Such processes, however, require organic solvent extraction either before or after the aqueous alkaline extraction which is costly or they require highly alkaline aqueous extraction which may nutritionally damage the protein. Aqueous processes such as described by Rhee et al. in J. Food Sci. 37:90 (1972) and J. Food Sci. 38:126 (1973) have been moderately successful for simultaneously recovering protein and oil from peanuts. This process, however, requires that the oilseed be finely ground before processing to achieve good recovery of protein and oil. Such pregrinding of crude grain gluten would be costly and time consuming. Thus, in each case, the prior art techniques are costly and time consuming, and the products which result are not completely satisfactory.

SUMMARY OF THE INVENTION

It is therefore highly desirable to employ a simple, efficient process for the removal of characteristic oils, flavors, odors, colors, carbohydrates and the like from commercial quantities of crude grain gluten without the disadvantages.

In accordance with the present invention, a novel method is provided for the preparation of a bland, functional, protein enriched product by forming an aqueous slurry of crude grain gluten at a pH between about 6.5 and 10.0, agitating the gluten slurry under suitable conditions to form a water emulsion with any oil present in the crude gluten, separating the gluten from the emulsion and drying the gluten.

DESCRIPTION OF THE INVENTION

As starting materials in this process, there can be used any crude grain gluten derived from well-known sources, including principally corn, sorghum and wheat. Usually, the grain gluten is a by-product of the grain processing industry and contains the proteinaceous residues of the endospern and germ, off-flavors, carbohydrates, fibrous cell components, grain hulls, oils and residual steepwater. At present, the spent gluten portion of grains, like that from corn and sorghum, is unfit for human consumption and is marketed as a source of animal feed only. Due to its availability, low cost and nutritionally good proteins, corn gluten obtained as a by-product from the saccharification of the starch in corn flour is the gluten preferred for use as the starting material in the present process. A typical analysis of such crude corn gluten may be about 50 to 70% moisture and, on a dry basis, about 45 to 56% protein, about 14 to 20% fats or oils, about 25 to 35% carbohydrate, about 3 to 5% fiber and about 2 to 3% ash. For the purposes of this invention, it is preferably to use the aqueous wet grain gluten which directly results as a by-product of the grain processing industry. However, dried grain gluten can also be used as the starting material.

In practicing this invention, an aqueous slurry containing the crude grain gluten is formed having a pH between about 6.5 and 10.0. Preferably, the pH is between about 7.0 and 7.5. A pH much below about 6.5 results in the extraction of little or no oil. A pH much above about 10.0 results in hydrolysis and nutritional degradation of the protein. The desired pH range is maintained by the addition of any suitable base, such as sodium hydroxide, potassium hydroxide, ammonium hydroxide and the like.

The temperature can be widely varied from about room temperature to elevated temperatures. Preferably the temperature is maintained at least about 70° C and most preferably maintained in the range between about 80° C and 95° C.

The aqueous slurry is then vigorously agitated for a sufficient period of time to form an aqueous emulsion with the oil present in the grain gluten. Suitable means for agitating the slurry include any high shear dispersing, high speed mixing or homogenizing device. Good reductions in oil content have been observed in as short an agitation time as about 5 minutes. Some samples, however, may require longer agitation of up to about 60 minutes to similarly reduce oil content.

The water to gluten ratio in the slurry is usually maintained using a batch mode at least about 15:1 on a dry weight basis. Preferably, the water to gluten ratio on a dry weight basis is between about 25:1 and 45:1. At ratios much below about 15:1, the resulting product has lower protein contents and higher oil contents.

After sufficient agitation, the gluten is separated from the oil-water emulsion by any suitable means, such as centrifugation. The emulsion containing oil and water soluble constituents extracted from the crude grain gluten is discarded. Residual amounts of oil and water soluble constituents can be further extracted by reslurrying the separated gluten in water and repeating the conditions described above. The separated gluten is then dried using such convenient means as spray drying, drum drying, freeze drying, vacuum drying and the like. The dried product is bland in flavor and odor, off-white to pale tan in color and usually contains about 60 to 75% protein, less than about 8% oil (preferably less than 3% oil) and about 20% insoluble carbohydrates.

It will be appreciated by those skilled in the art that the above process can be practiced as a batch or continuous process and that the concentration of materials and agitation times will vary depending upon the type of process or equipment selected. Thus, for example, in the batch process described above, a concentration ratio of about 15 to 45 parts of water to one part of gluten solids on a dry weight basis has been used successfully. In a continuous process, such as in a countercurrent, multistage extractor or liquid cyclone, it is possible to reduce the ratio of water to gluten solids and still achieve good extraction efficiency.

In addition to bland flavor and odor, pale color and enriched protein content, the instant protein products from grain gluten are desirably rich in sulfur-bearing amino acids, such as methionine and cystine. As a result, the products of this invention can be combined with protein products from other vegetable sources, such as soybeans, which are deficient in sulfur amino acids, to produce nutritionally superior products. Such combinations are extremely useful in the preparation of textured vegetable protein products, meat analogs and the like.

The following examples are illustrative of the invention and are not intended to limit the scope thereof.

EXAMPLE 1

This example illustrates the preparation of a bland, protein enriched product from crude corn gluten in a batch process. The corn gluten used in this example was derived as a by-product of a commercial process for saccharification of the starch in corn flour. Physically, the corn gluten was intensely yellow in color and had an undesirable "corny" flavor and odor and a bitter taste.

About 100 pounds of aqueous wet corn gluten containing about 33% solids dry weight was slurried with about 800 pounds of water, corresponding to a water-gluten ratio of about 26:1 on a dry weight basis, preheated to about 90° C to 100° C. The pH of the slurry was adjusted to between about 7.0 and 7.5 using 10 weight percent sodium hydroxide. The slurry was then vigorously agitated using a pilot plant immersion disperser (e.g., a model SDM110/2 sold by Tekmar Company, Cincinnati, Ohio) for 15 minutes to form a water-oil emulsion. The agitated slurry was pumped through an in-line disperser (e.g., a model DR3-6/6, sold by the Tekmar Company) to a centrifuge. The gluten solids were separated from the emulsion in the centrifuge. The separated gluten solids were reslurried in about 800 pounds of water at about 90° C to 100° C and the pH adjusted to between about 7.0 and 7.5. The slurry was then vigorously agitated using the above mentioned immersion disperser for 15 minutes to form an emulsion with any residual oil. The agitated slurry was pumped through the above mentioned in-line disperser to a centrifuge. The gluten solids were separated from any emulsion in the centrifuge. The separated gluten solids were then spray dried. The dried product was analyzed and found to have the chemical and physical properties shown in the following Table I.

TABLE I

| | |
|---|---|
| Protein | 68.9% dry solids basis |
| Carbohydrates | 26.8% dry solids basis |
| Oil | 1.8% dry solids basis |
| Ash | 2.5% dry solids basis |
| Color | Off-white |
| Odor | None |

EXAMPLE 2

A. This example illustrates the effect of pH on the protein and fat content of the protein product.

Six separate 50 gram samples of aqueous wet corn gluten containing about 30% solids were mixed with 1500 grams of water (corresponding to a 100:1 water to gluten ratio on a dry weight basis). The pH of each mixture as-is was about 5.0. To each sample there was added sufficient 10 weight percent sodium hydroxide to adjust the aqueous mixture to a selected pH value between about 5.0 and 10.8. The mixture was then heated to about 90° C and maintained at this temperature, with agitation, using a laboratory immersion disperser (e.g., a Tekmar Model SD/45, sold by the Tekmar Company) for 30 minutes to form an oil/water emulsion. The mixture was then centrifuged at 3000 RPM for 10 minutes. The separated gluten solids were then redispersed in water thus repeating the dispersion process. Following centrifugation, the separated gluten solids were freeze dried. The products were analyzed and found to have the following properties shown in Table II.

TABLE II

| Sample | Protein% Dry Basis | Oil% | Ash% |
|---|---|---|---|
| Starting Material | 53.8 | 16.0 | 2.3 |
| pH 5.0 | 53.8 | 15.1 | 2.4 |
| pH 7.0 | 67.0 | 3.0 | 2.8 |
| pH 8.0 | 67.7 | 3.4 | 3.2 |
| pH 9.0 | 70.6 | 4.6 | 2.8 |
| pH 10.0 | 65.5 | 6.9 | 3.6 |
| pH 10.8 | 12.1 | 28.4 | 13.7 |

The above data shows that good oil extraction takes place at a pH between about 7.0 and 10.0. At a pH much above about 10.0, the oil content is increased, the protein content is decreased and the sample is dark colored. Optimum oil extraction occurs at a pH between about 7.0 and 8.0.

B. This example illustrates the effect of pH between 5.0 and 7.5 on the protein product.

Six separate samples of frozen corn gluten containing about 30% solids were mixed with 90° C water at a ratio of 8 parts of water to 1 part frozen gluten (corresponding to about 25:1 water to gluten ratio on a dry weight basis). To each sample there was added sufficient 10 weight percent sodium hydroxide to adjust the aqueous mixture to a selected pH value between 5.0 and 7.5. The mixtures were maintained at 90° C and agitated for 10 minutes using a laboratory immersion disperser (e.g., Tekmar SD/45 sold by the Tekmar Company) to form an oil-water emulsion. The mixtures were centrifuged at 5000 RPM and the separated gluten solids were then freeze dried. The products were analyzed and found to have the following properties shown in Table III.

TABLE III

| Sample | Protein% Dry Basis | Oil% | Ash% | Carbohydrate% |
|---|---|---|---|---|
| Starting Material | 48.2 | 14.6 | 2.7 | 30.1 |
| pH 5.0 | 54.3 | 17.0 | 2.7 | 25.0 |
| pH 5.5 | 54.1 | 16.6 | 2.9 | 25.4 |
| pH 6.0 | 56.4 | 13.0 | 2.8 | 27.3 |
| pH 6.5 | 59.2 | 8.2 | 2.9 | 28.7 |
| pH 7.0 | 59.9 | 6.9 | 2.9 | 29.1 |
| pH 7.5 | 61.6 | 5.9 | 3.0 | 28.3 |

The above data shows that a marked decrease in oil content takes place between 6.0 and 6.5. Preferably the pH should be above about at least pH 6.5 for optimum oil extraction.

EXAMPLE 3

This example illustrates the effect of temperature on the protein product.

Five separate samples of frozen corn gluten containing about 30% solids were mixed with water using a ratio of 8 parts of water to 1 part of frozen gluten (corresponding to about 25:1 water to gluten ratio on a dry weight basis). The pH of each mixture was adjusted to pH 7.0 using 10 weight percent sodium hydroxide. Each mixture was then heated to a selected temperature between 30° C and 90° C and agitated for 10 minutes using the above mentioned laboratory immersion Tekmar disperser to form an oil-water emulsion. The samples were centrifuged to separate the emulsion and the residues were freeze dried and analyzed. The data is found in the following Table IV.

TABLE IV

| Sample | Protein% | Oil% | Ash% | Carbohydrate% |
|---|---|---|---|---|
| 30° C | 59.6 | 9.6 | 2.1 | 27.4 |
| 50° C | 60.4 | 8.5 | 2.1 | 28.1 |
| 70° C | 60.7 | 7.0 | 2.4 | 28.5 |
| 80° C | 60.7 | 7.1 | 2.6 | 28.5 |
| 90° C | 61.6 | 7.3 | 2.8 | 27.1 |

The above data indicates that the temperature may be widely varied and still result in good oil extraction. Optimum extraction occurs at a temperature above about 70° C.

EXAMPLE 4

This example illustrates the effect of obtaining an oil-water emulsion on the protein product.

Two separate 74 gram samples of freeze dried corn gluten were added to 1778 grams of water at 90° C at pH 7.0 and stirred slowly with a marine paddle for 10 minutes. No oil-water emulsion was formed with either sample. One of the corn gluten samples had been previously ground for 15 seconds to a small particle size in a laboratory electric food grinder (e.g., a Moulinex Model No. 228, manufactured by Varco, Inc., France). The other sample was used as-is. After extraction, each mixture was centrifuged to separate the extracted corn gluten. The products were analyzed and found to have the following properties shown in Table V.

TABLE V

| Sample | Protein% | Oil% |
|---|---|---|
| Ground | 53.2 | 16.0 |
| Unground | 52.9 | 18.3 |

When these results are compared with those obtained in EXAMPLE 2, it is clear that low shear and prior grinding of the gluten do not result in a desired decrease in oil content or a desired increase in protein content of the gluten product. Only those samples in which an oil-water emulsion has been formed result in the desirable protein product.

What is claimed is:
1. A method for preparing a bland, protein enriched product which comprises:
    (a) forming an aqueous slurry of a crude grain gluten containing oil and water soluble constituents at a pH between about 6.5 and 10.0 at a temperature at least about 70° C wherein the ratio of water to gluten is at least about 15:1 on a dry weight basis;
    (b) agitating the gluten slurry to form an oil and water emulsion;
    (c) separating the gluten from the emulsion containing oil and water soluble constituents; and
    (d) drying the separated gluten.
2. A method according to claim 1 wherein the grain gluten is corn gluten.
3. A method according to claim 1, wherein the pH of the aqueous slurry is between about 7.0 and 8.0.
4. A method according to claim 1, wherein the pH of the aqueous slurry is between 7.0 and 7.5.
5. A method according to claim 1 further comprising, prior to drying of the separated gluten, forming an aqueous second slurry of the separated gluten at a pH between about 7.0 and 8.0 and at a temperature of at least about 70° C; agitating the gluten slurry under suitable conditions to form a water emulsion with any residual oil; and separating the gluten from the emulsion.

* * * * *